Feb. 6, 1940.                H. MILLER ET AL                2,189,016
                   PROCESS FOR TREATING HYDROCARBONS
                      Original Filed Nov. 13, 1933
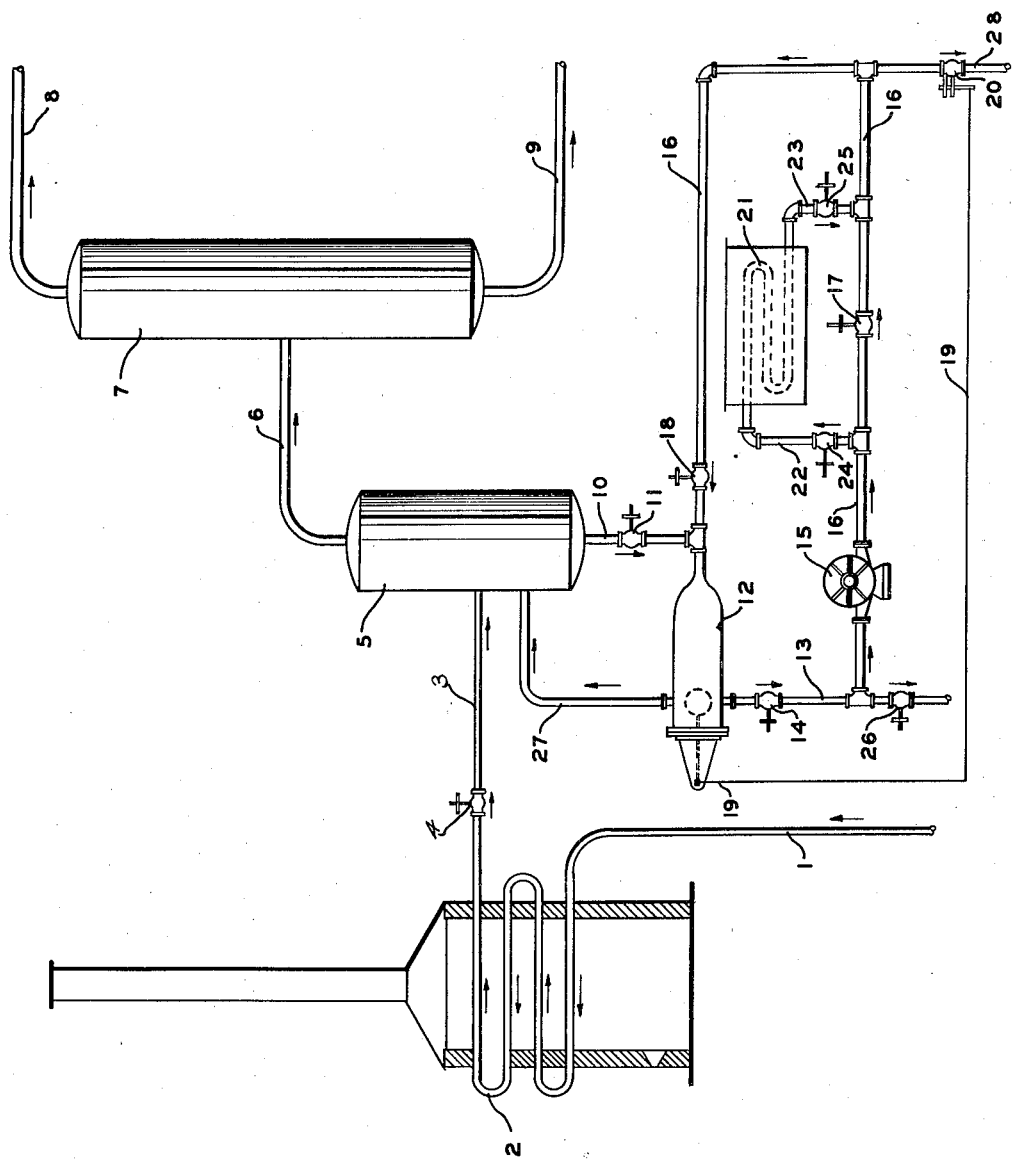
                                              INVENTOR.
                                          HUGH MILLER
                                          JAMES L. FARRELL
                                       BY
                                          Hudson, Conner, and Young
                                                  ATTORNEYS.

Patented Feb. 6, 1940

2,189,016

UNITED STATES PATENT OFFICE 2,189,016

PROCESS FOR TREATING HYDROCARBONS

Hugh Miller and James L. Farrell, Whittenburg, Tex.; Marjorie B. Farrell, executrix of said James L. Farrell, deceased, assignors to Phillips Petroleum Company, a corporation of Delaware Continuation of application Serial No. 697,795, November 13, 1933. This application April 2, 1936, Serial No. 72,394

1 Claim. (Cl. 196—58)

The present invention relates to a process for the pyrogenetic treatment of hydrocarbon oils and gases, and is a continuation of an earlier application for Letters Patent relating to a Process and apparatus for treating hydrocarbons filed November 13, 1933, by Hugh Miller and James L. Farrell, and bearing the Serial Number 697,795.

A general object of the invention is to improve the efficiency of pyrogenetic processes through the increase in cycle time and the shortening of cleaning periods.

A particular object of our invention is to inhibit the formation and deposit of carbon in those portions of the apparatus wherein carbon deposit usually occurs. By our invention this latter object is accomplished while the pyrogenetic conditions are maintained at the optimum for the various stocks treated.

Other objects and advantages of our new invention will become apparent as the following description proceeds.

The accompanying drawing diagrammatically illustrates one form of apparatus for practicing our new invention.

Referring to the drawing, charging stock, which may consist of relatively heavy hydrocarbons which are to be cracked for the production of motor fuel, or hydrocarbons of the motor fuel range or slightly heavier which are to be reformed in order to increase their anti-knock value or hydrocarbon gases which are to be converted to liquids, is fed through a pipe 1 to a heating coil 2 wherein the hydrocarbons are subjected to the conditions best suited to the type conversion desired. After passing through the coil 2 the hot converted material passes through a pipe 3 in which is mounted a valve 4 and is discharged into a chamber or separator 5. The valve 4 is manipulated to maintain any desired pressure on the material undergoing conversion in the coil 2 if the operations are to be carried out in liquid or semi-liquid phase. If the operations are to be of the vapor phase type the valve 4 may not be utilized. The hot products of conversion which enter the separator 5, separate into vapor and liquid portions, the vapors passing from the separator throuhg a pipe 6 which leads to a fractionating tower 7 where the vapors are subjected to reflux condensation and fractionation. Vapors remaining uncondensed in the tower 7 pass therefrom through a pipe 8 to treating and/or condensing equipment, not shown. The condensate which is collected in the lower portion of the tower 7 is withdrawn through a pipe 9 and discharged through cooling equipment to storage, not shown. When the converted material has passed the valve 4 and entered the separator 5 where the initial separation occurs, the temperature of the material in the separator 5 is usually still sufficiently high so that the conversion reaction will continue until the temperature has been sufficiently reduced to check the reaction. This additional period of time during which the hydrocarbon materials are subjected to conversion temperatures, results in over-cracking which is immediately attended by the formation of excessive quantities of carbon which will deposit in the separator 5 with subsequent clogging of the apparatus, resulting in frequent shut-downs for cleaning. Not only are the shut-downs frequent, resulting in shortened cycle time, but the removal of the carbon deposits are usually attended by considerable difficulty and entail considerable added expense. By our invention we overcome these difficulties in the following manner. The heavy liquid residue which separates from the vapors in the separator 5 falls to the bottom of the separator 5 and is withdrawn as rapidly as it collects through a pipe 10 in which is mounted a valve 11, and permitted to flow into a relatively small supplementary chamber or keg 12, where a small pool of it is permitted to collect. Liquid from this pool is continuously withdrawn through a pipe 13 and valve 14 by a pump 15 and discharged through a pipe 16 in which are mounted valves 17 and 18 and continuously returned to the keg 12. A circulation, usually very rapid in rate is thus set up in the keg 12, which results in cooling the residue leaving the separator 5 below conversion temperatures very quickly while maintaining considerable agitation, all of which serves to inhibit the formation of carbon and its deposit in the apparatus. An automatic float control 19 is mounted in the keg 12 which operates a valve 20 mounted in the pipe 28 and cooled residue is thus continuously discharged from the system. If more cooling is desired than is obtained by the described circulation, the residue may be passed through a cooling coil 21 by means of suitable branch connections 22 and 23 in which are mounted valves 24 and 25 respectively. If the cooler 21 is to be used, valves 24 and 25 are opened and valve 17 closed or partially closed, depending on the amount of cooling desired, all or part of the residue thus being directed through the cooler 21. An extension of pipe 13 in which is mounted a valve 26 is provided as an additional point of discharge of the residue whenever desirable. We have found in circulating the heavy residue in the keg 12, if no additional cooling such as obtained in the coil 21 is used, that considerable vaporization of the residue occurs in the keg 12 and we have therefore provided a vapor vent line 27 for returning the evolved vapors to the separator 5 where they mingle with the other vapor contained therein and passes therefrom through the pipe 6. By use of the circulating keg 12 we have been enabled to increase the specific gravity of the residue from a value of about 1.000 or less to values of approximately 1.2000 or more with an attendant increase in yield of vaporizable material of from 1-5% or more. Not only is there a reduction in the quantity of residue but by means of the rapid cooling and agitation, no degradation of the quality of the residue occurs. The solubility of the resultant very heavy residue usually being 99.5% or better in carbon disulfide and carbon tetrachloride, and there is no deposit of carbon or coke in the separator 5 or its attached equipment. On the other hand, in the usual methods of operation not only does carbon deposit in the separator, but the quality of the residue is greatly degraded. The solubility of such residue frequently running less than 95% in carbon disulfide and very much less than 95% in carbon tetrachloride.

In other processes it is frequently the practice to check the cracking reaction by injecting cooler oil into the hot material entering the separator or injecting cool oil into a pool of residue collected in the bottom of the separator. This nearly always results in requiring additional equipment for handling large volumes of oil and vapor and further additional equipment for recovering from the residue the lighter fractions which are valuable for further processing. All this is avoided by our invention, with the additional advantage that we are able to recover a residue of superior quality such that it is highly desirable for use as road oil and asphalt.

It will be apparent of course, that the tar keg 12 may vary widely in its dimensions depending on the capacity of the conversion still, the quantity of residue made, and other conditions which may vary widely with different processes and modes of operation. In our operations we have most frequently used a keg having the approximate dimensions, 6 feet long by 20 inches in diameter in conjunction with a primary separator usually 8 feet in diameter by 20 feet long.

In the operation of our process, the temperatures used may vary widely depending on the type stocks treated, the pressure conditions under which the process is conducted, the type products desired, etc. The temperature of the converted material leaving the coil 2 is most frequently between 800° F. and 1050° F. and may be higher or lower depending on conditions. Through pressure reduction and vaporization in the separator 5 the temperature of the residue which falls to the lower portion of the separator 5 is reduced usually to a value between 725° and 850° F., although these temperatures are also subject to considerable variation depending upon conditions. By means of the circulation through the keg 12 the temperature of the residue is further reduced to from 550° F. to 750° F. depending upon the amount of external cooling, rate of circulation, original temperature of the residue, etc.

The pressure conditions may vary widely also depending on the type process used and the stocks treated. In vapor phase processes the pressures throughout will generally be from substantially atmospheric to pressures up to 50 pounds. In liquid phase process the pressures are also subject to wide variation, ranging from about 50 pounds to 3000 pounds or more in the heating coil, with usually a decrease in pressure in the separating zones to some lower values, although it may be desirable at times to maintain the full coil pressure throughout the separating zones.

As one specific example, we charged a recycle gas oil of 16.5° A. P. I. gravity into the coil 2 and heated it to a temperature of 920° F. under a pressure of 350 pounds gauge. After pressure reduction and partial cooling in the transfer line the cracked material entered the separator 5 at a temperature of 775° F. which fell to 750° F. at the bottom of the separator 5. By circulating in the keg 12 without external cooling the temperature was reduced to 725° F. which resulted in the production of 9.6% residue having a specific gravity of 1.1002, solubility in carbon disulfide 99.92%, solubility in carbon tetrachloride 99.48%. The still was operated under these conditions for a period of about 30 days, and when cleaned was found to contain very little carbon deposit at any point.

In this particular example the pressures used were as follows: 350 pounds gauge in front of the valve 4, and 55 pounds gauge in the separator 5 and the tar keg 12.

It can thus be readily seen that our invention has resulted in a new and very useful improvement in the art of pyrogenetic treatment of hydrocarbons.

We therefore desire to claim all the variations and modifications of our process and apparatus which fall within the spirit and scope of the appended claim.

We claim:

A process for treating hydrocarbons in which the hydrocarbons are subjected to conversion conditions in a heating zone, and the effluent of the heating zone passed to a separating chamber where it is separated into vapors and liquid, comprising maintaining the separating chamber substantially free of accumulated liquid by immediately passing the liquid to a supplemental chamber where the liquid is segregated from direct contact with the effluent of said heating zone, maintaining a pool of the liquid in the supplemental chamber, withdrawing liquid from the supplemental chamber, cooling the withdrawn liquid and recirculating the cooled liquid to the supplemental chamber to agitate and cool the liquid in the supplemental chamber to prevent excessive formation of carbon, the size of the pool of liquid in the supplemental chamber being such that liquid is segregated for a period of time and at a temperature sufficient to increase the specific gravity of the liquid.

HUGH MILLER.
JAMES L. FARRELL.